Oct. 29, 1968

B. FISHER 3,408,568

SERVO-BALANCING VOLTMETER EMPLOYING AN OVERVOLTAGE PROTECTED
CHOPPER AND A D.C. DAMPED SERVO-MOTOR

Filed June 24, 1963

INVENTOR.
BERNARD FISHER

BY

*Martin F. Gilbert*

ATTORNEY

United States Patent Office 3,408,568
Patented Oct. 29, 1968

3,408,568
SERVO - BALANCING VOLTMETER EMPLOYING AN OVERVOLTAGE PROTECTED CHOPPER AND A D.C. DAMPED SERVO-MOTOR
Bernard Fisher, Dayton, Ohio, assignor to United Systems Corporation, Dayton, Ohio, a corporation of Ohio
Filed June 24, 1963, Ser. No. 290,020
3 Claims. (Cl. 324—99)

ABSTRACT OF THE DISCLOSURE

The invention contemplates the incorporation into a digital reading meter of the servo-balancing potentiometer type employing chopper comparator means, of a pair of oppositely poled diodes in parallel across a pair of chopper contacts, with unlike poles facing one another. The diodes are arranged to employ the forward characteristic or forward drop of the diodes so as to limit the voltage across the chopper contacts to the normal ½ volt drop typical of the forward characteristic of such diodes. In another aspect of the invention a capacitor is employed in the base biasing circuit of a transistor stage of the amplifier which discharges when the AC error signal disappears to thus permit the higher static DC current level to pass through the motor coil to create a drag field on the motor to effect braking action.

---

This invention relates to a digital reading meter for measuring volts, amperes, resistance, etc.

Digital reading meters have been available which employ stepping switches. Such devices tend to render such instruments unreliable. Servo-balancing potentiometer type meters have also been known, and among such devices have been those employing chopper comparators for comparing a known voltage with an unknown voltage signal derived from a means for measuring the unknown quantity information desired to be read. In such devices motors have been employed which are powered by the resultant signal from such comparator to in turn drive a readout counter and also re-balance the potentiometer circuit. However, overshooting or undershooting has been found to occur in such devices, with resultant undesired hunting taking place.

It is therefore one object of the invention to provide a precision servo-balancing potentiometer type meter employing a chopper comparator with means for damping the signal fed to the servo motor as the meter approaches the correct reading of the unknown quantity.

It is a further object of the invention to provide a means for limiting the voltage seen by the chopper comparator whereby chopper life is prolonged.

A still further object of the invention is to provide a digital reading meter which achieves high reliability by employing transistorized components and by requiring only relatively low power, whereby heat rise is minimized.

These and further objects of the invention will become more readily apparent from a reading of the description following hereinafter, and from an examination of the drawings, in which.

Figure 1:
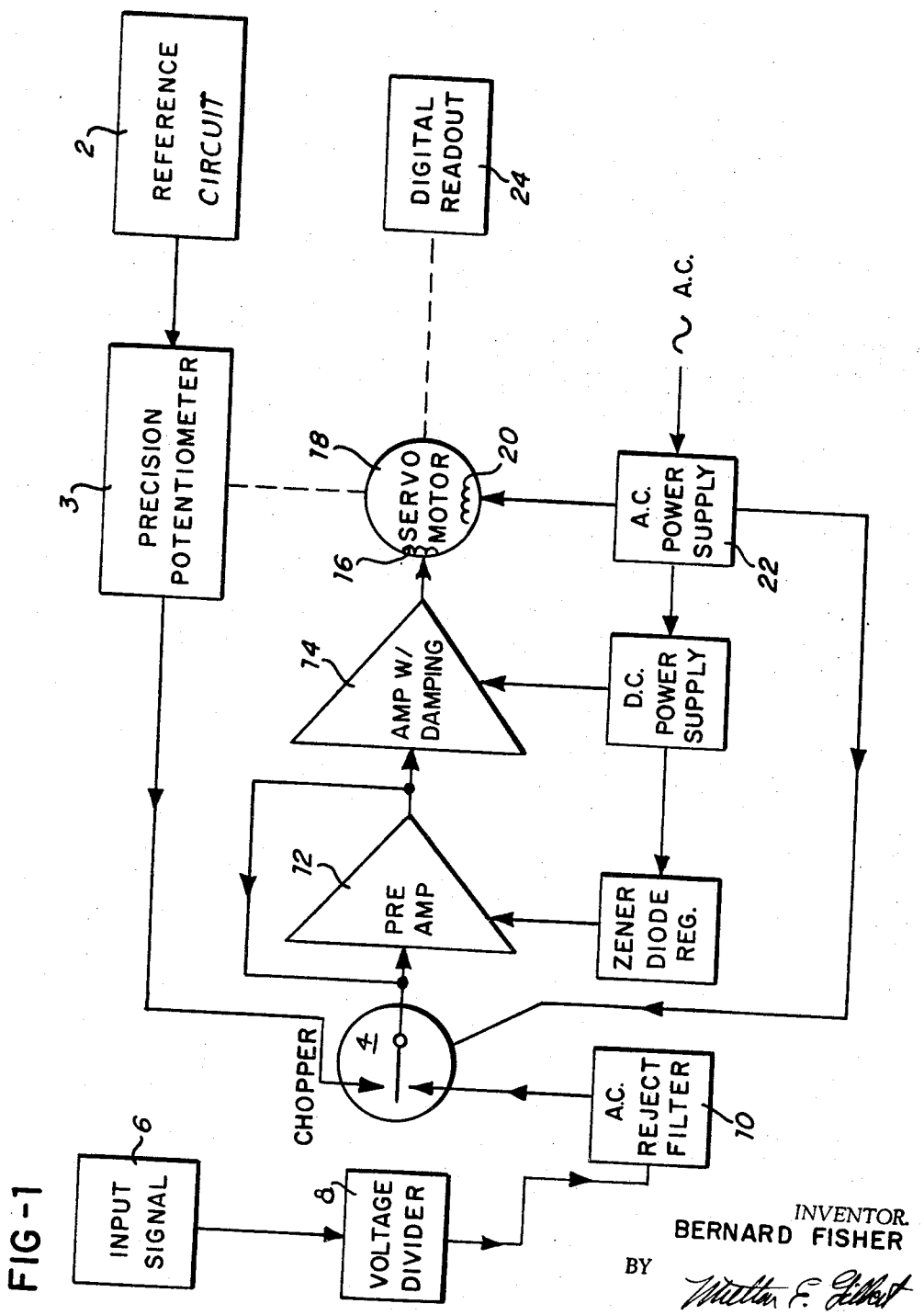
FIGURE 1 is a flow diagram of the digital meter of the invention.

The invention is illustrated hereinafter with reference to the meter of the invention being employed to measure voltages. Referring now to FIG. 1, it is seen that a reference cell 2 provides a reference signal for a motor driven precision potentiometer 3, which feeds one side of a chopper 4. The other side of the chopper receives an unknown signal input 6, which is fed through a voltage divider network 8 and a filter network 10. The output of the chopper 4 is fed to a preamplifier 12 and thence to an amplifier 14 providing novel damping means. This damping means makes possible extremely high slewing speeds with negligible overshoot and hunting at the null position. The output of the damping stage in turn excites one phase 16 of a two-phase motor 18. The other phase 20 is continually suppliead with AC power from a power supply 22. The motor 18 is mechanically connected with a counter display 24, and also is mechanically connected to drive the reference signal potentiometer 3. This servo motor 18, upon receiving the amplified signal from the amplifier 14, drives the digital counter display 24 and the balancing potentiometer 3 in the direction to cancel the difference voltage seen across the chopper comparator 4. When this voltage difference becomes zero, the voltage indicator will accurately present the voltage under measurement in digital form.

Figure 2:
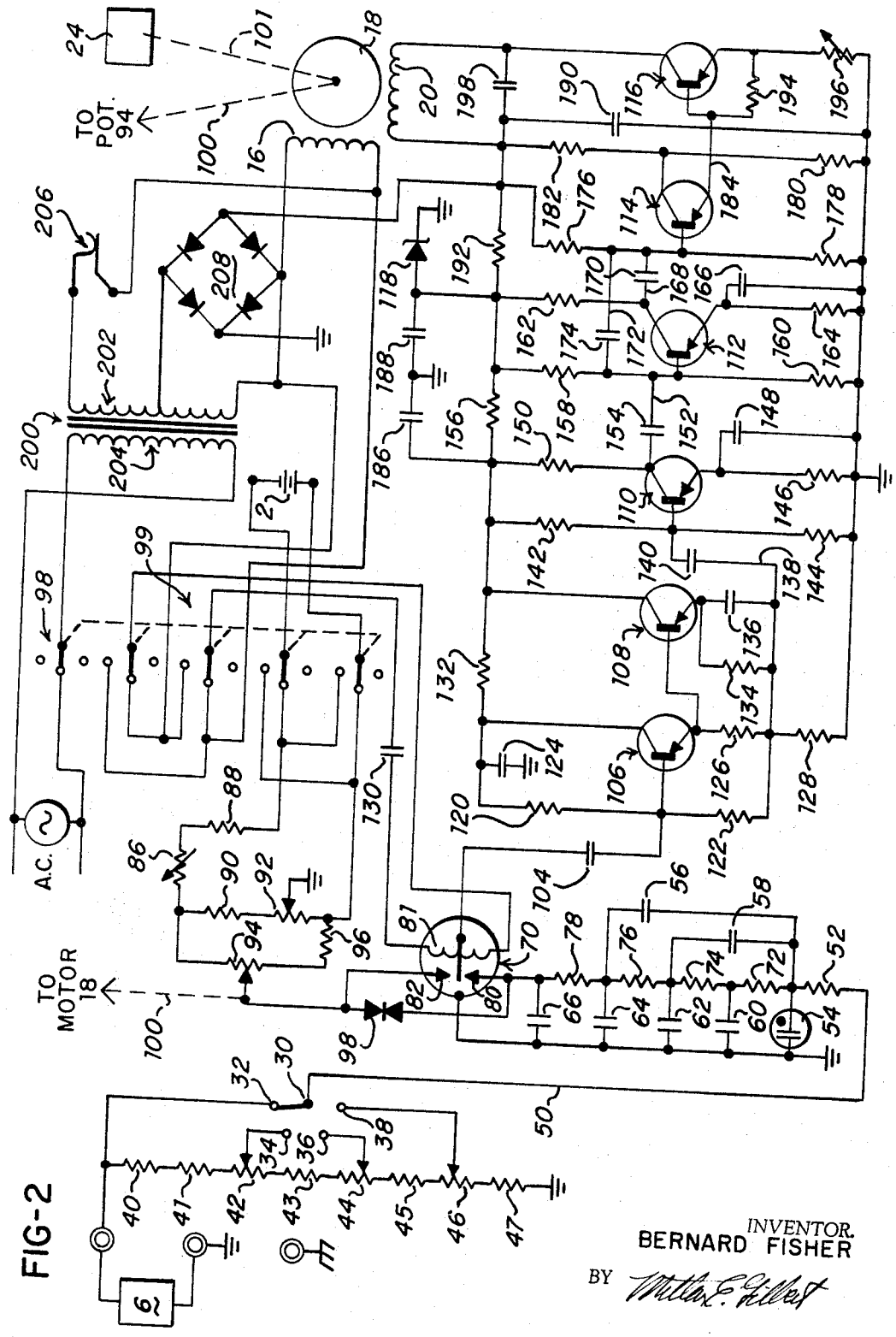
FIGURE 2 is a schematic diagram of the electric circuit of the meter of the invention.

The electrical circuit of the meter, shown in FIGURE 2, is indicated as having multi-range capacity, although it is to be readily understood that the device of the invention can be modified for single range operation. The unknown DC voltage signal input 6 is fed through the voltage divider network 8. The latter consists of a series of resistances 40, 41, 42, 43, 44, 45, 46 and 47. A selector switch 30 cooperates with four contacts 32, 34, 36 and 38 to select the several operating ranges of the instrument, four being illustrated. In each position different resistances of the voltage divider network are connected into the circuit. Thus, assuming that the selector switch is placed in the position contacting the contact 34, a given range would be selected, and the resistors 40, 41 and a portion of 42, would be placed into circuit. The resistors 42, 44 and 46 are made variable in order to provide for factory adjustment.

The output of the divider network is fed through line 50 to a voltage limiting circuit which consists of resistor 52 and a lamp 54, which is preferably a neon or other gas type bulb. The voltage limiting circuit breaks over at a predetermined voltage, therefore limiting the voltage that may be present due to over-voltage conditions on the input. The neon bulb will conduct and exhibit a constant voltage characteristic at the firing point of the bulb.

The output of the voltage limiting circuit is fed through the filter network 10 to one contact 80 of the chopper 70. The filter network consists of a series of resistances and capacitors 56, 58, 60, 62, 64, 66; and 72, 74, 76 and 78. The filter network preferably is a wide band semi-tuned filter which is peaked at the carrier frequency of the amplifier. The output of the filter network is substantially a pure DC signal even with considerable AC component in the input signal 6.

The chopper 70 is a voltage comparator which compares the unknown voltage signal at contact 80 (supplied through the filter network 10), with a known voltage derived from a reference circuit 2, which may comprise a mercury or other reference cell (e.g. a Zener reference assembly or other well known reference source). In addition to the reference source, the reference circuit includes resistances 86, 88, 90, 92 and 96. The reference circuit powers the potentiometer 94. The wiper arm of the latter is motor driven by the mechanical connection 100 with the motor 18 so that only a predetermined portion of reference voltage is applied to the chopper. The resistances 92 and 86 are respectively made variable in order to provide a zero and a calibration adjustment. A switch 98 is provided to reverse the reference voltage polarity. The voltage reference appearing in the slider of the potentiometer 94 also appears at the chopper contact 82.

The chopper oscillates at the AC line frequency, and continuously compares the voltages at the contacts 80 and 82. When a potential difference appears across these contacts, a square wave is developed, whose amplitude and phase is a function of the differences in the magnitude and polarity of the DC voltages presented to the opposite sides of the chopper.

Chopper contacts are usually made of gold or of some noble metal or alloy of noble metals. Such material has excellent drive circuit or low resistance properties for low current and low voltages. However, such contacts have poor high voltage or high current handling ability. Therefore, the life of a chopper in the instrument of the invention would be desirably prolonged if the voltage drop appearing across the contacts were limited. When this is accomplished, the switching arm or armature of the chopper will see a low voltage when transferring from one contact to the other, thus reducing contact wear due to sparking. In order to accomplish this desirable end there is provided a pair of diodes, which may conveniently be a double junction diode 98, in parallel with the chopper contacts 80 and 82. The threshold voltages of the diodes are so selected that only a low voltage value need appear before the chopper contacts are bypassed through the diode. By using a pair of oppositely poled diodes, the bypassing of the chopper contacts will occur no matter what the polarity of the input voltage. Thus any voltage across the chopper greater than the threshold voltage of the diodes goes through the diodes into a low resistance network, i.e. the potentiometer 94, back to ground. The low resistance network also includes the resistance 96 and a portion of the zero adjustment resistor 92. The diodes further serve to limit the voltage applied to the transistor amplifier 12.

The output of the chopper is coupled through the capacitor 104 to the amplifier. What is shown is a six stage amplifier employing six transistor stages 106, 108, 110, 112, 114 and 116, although any number of desired stages may be employed.

It is noted that a capacitor 130 is employed in series with the chopper coil 81. Since the chopper coil 81 is excited with a given frequency and the square wave output resulting from the contact action normally would lag the induced frequency into the coil, the inclusion of the capacitor 130 causes a leading current to bring the effect of the contact action back into phase. The chopper coil is thus phase shifted in order to account for the inherent phase lag of the chopper contacts.

The capacitor 104 serves to block any DC into the amplifiers, so that only AC is applied into the first stage of the amplifier. Stage 106 is an emitter follower stage to provide impedance conversion. Resistors 120 and 122 set the bias level for the base of the transistor 106. Capacitor 124 serves as a filter capacitor in the power supply. Resistors 126 and 128 serve as output load resistance of the emitter-follower. Resistor 132 serves as a decoupling resistor for the power supply.

The output of this first stage transistor amplifier 106 is impressed over line 134 on the base of transistor 108. The RC network 134, 136 serves both as the emitter bias for the transistor 108 and as the emitter load.

The output of the second stage transistor-amplifier is transmitted over line 138 through the blocking capacitor 140 to the base of transistor 110. Biasing resistors 142 and 144 are provided for the base of transistor 110. The RC network 146 and 148 serves as a bias for the emitter of transistor 110. Resistor 150 serves as the collector load. The output of the third stage transistor amplifier is impressed over line 152 through blocking capacitor 154 to the fourth stage amplifier.

A power supply decoupling resistor 156 is provided in series with the collector load resistor 150. Resistors 158 and 160 serve to bias the base of transistor 112. A load resistor 162 for the collector of transistor 112 is provided, as well as an RC network 164, 166 for the emitter.

The output of the fourth stage transistor amplifier is transmitted over line 168 through blocking capacitor 170 to the fifth stage. It is noted that negative feedback is provided over line 172 through capacitor 174 to the base of transistor 112. This reduces phase shift in the fourth stage amplification and helps linearize its output. Resistors 176 and 178 serve to bias the emitter follower stage transistor 114. Resistors 180 and 182 serve as a voltage divider to reduce the maximum voltage on the collector of transistor 114. Filter capacitors 186, 188 and 190, together with blocking resistor 192, are provided to remove spurious signals at their circuit locations. The output of the fifth stage transistor amplifier is transmitted over line 184 to transistor 116. A base bias for the transistor is provided by the resistor 194. Emitter bias is provided by the resistor 196.

The output of the amplifier powers the coil 20 of the motor 18, which is phase displaced by the capacitor 198 from the coil 16.

A Zener diode 118 serves to regulate the voltage applied on the transistor stages 106, 108, 110 and 112; which prevents regeneration through the power supply stages 114 and 116, which in turn would cause unwanted oscillation.

The second phase 16 of the motor 18 is connected directly across the secondary 202 of the power transformer 204 to receive a constant voltage supply. A closed circuit jack 206 is provided to maintain a closed circuit until an external switching means is plugged therein. The purpose of such external switch (not shown) is to remove power at the time of its opening from the motor phase 16 and also from the chopper coil 81. By so doing, no error signal can be created at the chopper output, nor can such a signal pass through the amplifier. There is thus zero output appearing at the phase 20, and since the coil 16 is also disconnected, by the same means, the motor immediately stops when the external switch is opened. Whatever reading was presented at the display is thus retained to avoid recycling of the counters when taking successive readings of about the same values. Upon the closing of the external switch the instrument is restored to active operation.

The chopper coil 81 is also powered through the portion 99 of the reversing switch 98, across the secondary 202 of the power transformer 200. The input to the chopper coil is thus reversed at the same time that the polarity of the reference battery is reversed.

The winding 20 may be made to resonate at 60 cycles, thus making the motor more efficient at this frequency. The full wave diode bridge 208 serves to rectify the output of the power transformer 200.

As indicated above, the AC two phase motor has its phase 16 excited with line frequency and phase from the transformer 200. The winding 20, which is phase displaced from winding 16, is excited through the transistor driver circuit which imposes the AC voltage and also a static DC voltage thereon, since current always flows through the transistor 116. The DC voltage serves to damp or brake the motor. The quantity of AC power transmitted to coil 20 is determined by the error signal level that is amplified. The greater the error signal, the greater the AC level, and conversely the lower the DC level. Since the DC signal cannot serve to drive the AC motor, it does not influence drive motor speed when a large error signal is detected by the chopper. However as the drive motor drives the potentiometer towards its null position at a new voltage reading, the AC level starts to fall down and the DC level respectively increases so that when the DC level goes up it starts a braking or damping action on the motor to further decrease motor speed. When null position is reached the coil 20 sees a relatively high DC level and zero AC level, which insures against overshooting and hunting.

The relative interaction of the AC and DC signals is more clearly seen by an examination of the characteristic operation of the transistor stage 116. The output of the secondary 202 of the transformer powers the amplifier through the diode rectifier bridge 208. Hence the DC source constantly energizes transistor 116. Since the motor coil 20 is in series with the collector-emitter circuit of transistor 116, the coil 20 always receives a DC signal when the instrument is turned on. This DC signal level produces a resistance to generated torque. As indicated above, as the AC error signal builds up, the negative effect of the DC signal on the winding is greatly overcome by the AC imposed. However, as the signal begins to collapse, i.e. the pot 94 approaches balance, the DC level actually rises. This is due to the residual charge remaining on the capacitor 170 when the error signal collapses, i.e. coupling capacitor 170 retains a peak charge. This charge is dissipated with a resultant increase in the DC level output of transistor 116 at a time when the AC level is almost zero to effectively null out the meter before the DC level finally does drop. The mechanism by which this occurs is further clarified when it is considered that the capacitor 170 assumes an average charge when AC passes through it whose level is determined as a function of the average DC level at the opposite sides of capacitor 170. The actual instantaneous voltage appearing across capacitor 170 is a function of the AC waveform passing through it, i.e. it will successively charge and discharge at the AC current rate; but it will also maintain an average voltage that is a function of the average voltage drop across it. When the AC disappears instantly, the capacitor 170 sees a charge across it that it has assumed during the period that it was excited with the AC error signal. It is this charge which results in the slight increase in DC level as capacitor 170 discharges for the final time after zero AC error occurs.

The residual DC level impressed on coil 20 is brought about due to the biasing of the transistor 116 which normally prevents the transistor to go either to full saturation or cut off.

Thus, although it has been considered undesireable to apply DC signal to an AC motor, and circuits including transformer secondary isolation have been employed to accomplish this (e.g. isolate the motor from the amplifier by driving it directly from the transformer secondary), I have found it to be desireable to permit the DC signal to be impressed across one coil of the motor because of the advantageous braking effect, i.e. the drag field produced. The motor employed in the instant invention is operated at a very low level and therefore the momentary heat dissipation through it by the relatively high level DC signal does not adversely affect motor operation or instrument control.

While there has been described and illustrated a specific application of the invention to a voltage meter, it is to be readily understood that the circuit of the invention may find various applications analogous thereto; and further that the circuit may be so modified and rearranged without departing from the spirit and scope of the invention as set forth in the claims appended hereto.

What I claim is:
1. Electrical measuring apparatus for measuring and indicating the magnitude of an unknown quantity input signal, comprising:
   a reference signal generating circuit;
   means for quantitatively comparing said reference signal and input signal and creating an alternating output signal as a function of said signal comparison;
   a multistage amplifier aranged to receive said output signal for amplification;
   a multiphase servomotor means having at least one phase excited by a constant AC power supply and at least one other phase excited by the amplified alternating output signal;
   indicator means driven by the servomotor,
   means driven by said servo motor for progressively cancelling said alternating output signal and thereby removing excitation from said other servomotor phase;
   said amplifier including a driver circuit which imposes a DC signal in addition to said amplified output signal on said other servomotor phase, said DC signal serving to create a drag field in said servomotor whereby when said alternating output signal approaches complete cancellation the drag field serves to brake said servomotor and thereby avoid overshooting of input signal indication, said driver circuit including a transistor stage constantly energized by a DC source, and a capacitor in the base biasing circuit of said transistor, said capacitor being so selected whereby the discharge of said capacitor upon collapse of said alternating output signal serves to momentarily increase the DC signal level impressed upon said other servomotor phase to a high peak to increase said braking action just after alternating output signal cancellation.

2. The apparatus of claim 1 wherein said transistor driver stage is provided with a constant negative bias so as to normally prevent full saturation or cutoff thereof.

3. A digital reading meter of the servo-balancing potentiometer type including, in combination:
   a potentiometer calibration circuit including a reference circuit for generating a reference signal;
   an input circuit for receiving an unknown signal input;
   a chopper comparator means being connected to receive and compare said input and reference signals, and to create an output signal as a function of such signal comparison;
   a multistage amplifier arranged to receive and amplify said chopper output signal;
   a multiphase servomotor means having at least one phase excited by a constant AC power supply and at least one other phase excited by the amplified alternating chopper output signal, said servomotor being mechanically connected for progressively driving the potentiometer of said potentiometer calibration circuit so as to cancel said chopper output signal, and thereby remove excitation from said other servomotor phase;
   indicator means driven by the servomotor, said amplifier including a driver circuit having a transistor stage constantly energized by a DC source and serving to impose a constant DC signal in addition to said amplified output signal on said other servomotor phase, said DC signal serving to create a drag field in said servomotor whereby when said alternating output signal approaches complete cancellation the drag field acts to brake said servomotor and thereby avoid overshooting of input signal indication, and a capacitor in the base biasing circuit of said transistor, said capacitor being so selected whereby the discharge of said capacitor upon collapse of said alternating chopper output signal serves to momentarily increase the DC signal level impressed upon said other servomotor phase to a high peak to increase said braking action just after alternating signal cancellation.

References Cited

UNITED STATES PATENTS

| | | | |
|---|---|---|---|
| 2,528,017 | 10/1950 | Stanton | 318—212 |
| 2,789,254 | 4/1957 | Bodle et al. | 307—88.5 |
| 2,832,924 | 4/1958 | Cilyo | 318—212 |
| 2,861,239 | 11/1958 | Gilbert | 307—88.5 |
| 2,920,260 | 1/1960 | Goffstein | 321—49 X |
| 3,183,446 | 5/1965 | Richman | 324—140 |
| 3,210,663 | 10/1965 | Moseley et al. | 324—99 |
| 3,211,981 | 10/1965 | Jordan | 318—28 X |

OTHER REFERENCES

Scott, Robert F., New Easy To Read VTVMS in Radio-Electronics, pp. 44–47, vol. 27, No. 4, April 1956.

Shaughnessy, R. J., "The Zener Diode," June 1961, pp. 76–82, Popular Electronics.

RUDOLPH V. ROLLINEC, *Primary Examiner.*

E. F. KARLSEN, *Assistant Examiner.*